(12) United States Patent
Tohji et al.

(10) Patent No.: US 9,296,613 B2
(45) Date of Patent: Mar. 29, 2016

(54) DISPERSION OF CARBON MATERIAL AND PROCESS FOR PRODUCING SAME

(75) Inventors: Kazuyuki Tohji, Sendai (JP); Yoshinori Sato, Sendai (JP); Shinji Hashiguchi, Izumiotsu (JP); Kazutaka Hirano, Izumiotsu (JP)

(73) Assignees: NATIONAL UNIVERSITY CORPORATION TOHOKU UNIVERSITY, Sendai-Shi, Miyagi (JP); STELLA CHEMIFA CORPORATION, Osaka-Shi, Osaka (JP)

( * ) Notice: Subject to any disclaimer, the term of this patent is extended or adjusted under 35 U.S.C. 154(b) by 950 days.

(21) Appl. No.: 13/142,237

(22) PCT Filed: Dec. 18, 2009

(86) PCT No.: PCT/JP2009/071158
§ 371 (c)(1),
(2), (4) Date: Jun. 24, 2011

(87) PCT Pub. No.: WO2010/074000
PCT Pub. Date: Jul. 1, 2010

(65) Prior Publication Data
US 2011/0253945 A1 Oct. 20, 2011

(30) Foreign Application Priority Data
Dec. 24, 2008 (JP) .................... 2008-328369

(51) Int. Cl.
*H01B 1/04* (2006.01)
*C01B 31/02* (2006.01)
(Continued)

(52) U.S. Cl.
CPC ............... *C01B 31/02* (2013.01); *B82Y 30/00* (2013.01); *B82Y 40/00* (2013.01); *C01B 31/0213* (2013.01);
(Continued)

(58) Field of Classification Search
CPC ............................... B82Y 30/00; C01B 31/00
USPC ........ 252/500, 582; 423/447.1; 977/742, 750, 977/835, 840; 204/294; 570/150
See application file for complete search history.

(56) References Cited

U.S. PATENT DOCUMENTS 3,567,618 A * 3/1971 Foulletier et al. ............. 204/294
3,929,918 A * 12/1975 Meshri et al. ................. 570/150
(Continued)

FOREIGN PATENT DOCUMENTS

| JP | 64-66246 A | 3/1989 |
|---|---|---|
| JP | 2-170801 A | 7/1990 |

(Continued)

OTHER PUBLICATIONS

E. T. Mickelson, et al.; Solvation of Fluorinated Single-Wall Carbon Nanotubes in Alcholol Solvents; J. Phys. Chem. B. 1999; 4318-4322.
(Continued)

*Primary Examiner* — Khanh Tuan Nguyen
(74) *Attorney, Agent, or Firm* — Knobbe Martens Olson & Bear LLP

(57) ABSTRACT

The invention is directed to a carbon material dispersion, including: a fluorinated carbon material having a fluorinated surface formed by bringing a treatment gas with a fluorine concentration of 0.01 to 100 vol % into contact with a carbon material under conditions at 150 to 600° C.; and a dispersion medium in which the fluorinated carbon material is dispersed.

10 Claims, 1 Drawing Sheet

(51) Int. Cl.
*B82Y 30/00* (2011.01)
*B82Y 40/00* (2011.01)
*C01B 31/04* (2006.01)
*C01B 31/06* (2006.01)
*C09C 1/44* (2006.01)
*C09C 1/46* (2006.01)
*C09C 1/56* (2006.01)
*D01F 11/12* (2006.01)
*C09C 1/48* (2006.01)

(52) U.S. Cl.
CPC ......... *C01B 31/0253* (2013.01); *C01B 31/0273* (2013.01); *C01B 31/0293* (2013.01); *C01B 31/04* (2013.01); *C01B 31/06* (2013.01); *C09C 1/44* (2013.01); *C09C 1/46* (2013.01); *C09C 1/48* (2013.01); *C09C 1/56* (2013.01); *C09C 1/565* (2013.01); *D01F 11/121* (2013.01); *C01B 2202/06* (2013.01); *C01P 2004/04* (2013.01); *C01P 2004/13* (2013.01)

(56) References Cited

U.S. PATENT DOCUMENTS

| | | | |
|---|---|---|---|
| 5,498,281 | A | 3/1996 | Idogawa et al. |
| 6,068,921 | A * | 5/2000 | Yamana et al. ............... 428/402 |
| 6,346,023 | B1 | 2/2002 | Tsuboi et al. |
| 6,835,366 | B1 | 12/2004 | Margrave et al. |
| 2001/0041160 | A1 | 11/2001 | Margrave et al. |
| 2002/0004028 | A1 * | 1/2002 | Margrave et al. .......... 423/447.3 |
| 2002/0086124 | A1 | 7/2002 | Margrave et al. |
| 2004/0064004 | A1 | 4/2004 | Margrave et al. |
| 2004/0258603 | A1 | 12/2004 | Yakobson et al. |
| 2007/0209093 | A1 * | 9/2007 | Tohji et al. .................... 977/840 |

FOREIGN PATENT DOCUMENTS

| | | | |
|---|---|---|---|
| JP | 3068664 | 3/1991 | |
| JP | 06-80915 A | 3/1994 | |
| JP | 2000-072422 | 3/2000 | |
| JP | 2000-86219 | 3/2000 | |
| JP | 2004-352608 * | 12/2004 | ............. C01B 31/02 |
| JP | 2005-200272 | 7/2005 | |
| JP | 2008-019101 | 1/2008 | |
| WO | 00/17101 A1 | 3/2000 | |
| WO | 2005095274 A1 | 10/2005 | |

OTHER PUBLICATIONS

E. T. Mickelson, et al.; Fluorination of Single-Wall Carbon Nanotubes; Chemical Physics Letters 296 (1998); 188-194.
Office Action issued Jan. 14, 2013 in corresponding Chinese Application No. 200980152618.7.
Extended European Search Report dated Oct. 8, 2014 in corresponding EP Application No. 09834801.4.
Decision to Dismiss the Amendment mailed Jan. 13, 2015 in corresponding JP Application No. 2010-544043.
Decision of Refusal mailed Jan. 13, 2015 in corresponding JP Application No. 2010-544043.

* cited by examiner

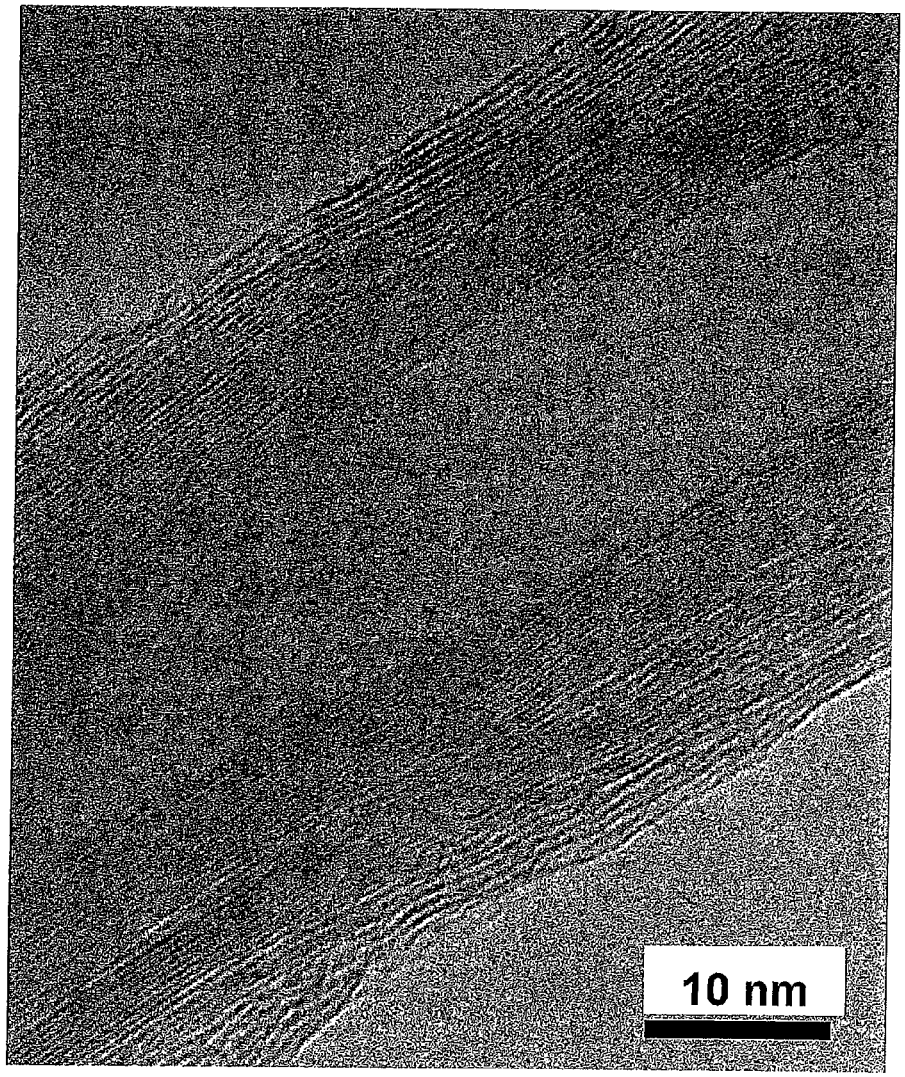

DISPERSION OF CARBON MATERIAL AND PROCESS FOR PRODUCING SAME

CROSS-REFERENCE TO RELATED APPLICATIONS

This application is the U.S. National Phase under 35. U.S.C. §371 of International Application PCT/JP2009/071158, filed Dec. 18, 2009, which claims priority to Japanese Patent Application No. 2008-328369, filed Dec. 24, 2008. The International Application was published under PCT Article 21(2) in a language other than English.

TECHNICAL FIELD

The invention relates to a carbon material dispersion including a dispersion medium and a fluorinated carbon material dispersed therein and to a method for production thereof. More specifically, the invention relates to a carbon material dispersion that is designed to allow various applications of carbon nanotubes, carbon nanocoils, fullerenes, graphite, carbon black, diamond-like carbon, carbon fibers, amorphous carbon, or the like, and to a method for production thereof.

Carbon nanotubes are tubular materials with diameters of 1 μm or less, which are composed of carbon and have different properties depending on the number of hexagonal networks or the tube diameter. Therefore, carbon nanotubes are expected to be potential mechanical/functional materials.

When mechanical and functional materials are produced with carbon nanotubes, it is helpful to use a dispersion containing carbon nanotubes uniformly dispersed in a dispersion medium. For example, a polymer and a dispersion in which carbon nanotubes are uniformly dispersed may be mixed together so that a nanocomposite containing the carbon nanotubes uniformly dispersed in a polymer matrix can be formed. A dispersion containing uniformly dispersed carbon nanotubes can also be used to form an optical device based on the high scattering properties of the dispersion. When purified, such a dispersion is also used in the field-effect transistors, field emission devices, secondary batteries, or the like. Examples of the dispersion medium include water, an acid solution, an alkaline solution, alcohols, ethers, petroleum ether, benzene, ethyl acetate, chloroform, acetone, and toluene and others.

Unfortunately, methods for sufficiently dispersing carbon nanotubes in a solvent have not been established yet. This is because cohesive forces (van der Waals forces) act between carbon nanotube molecules to form them into a bundle or a cord. Carbon nanotubes also have smooth surfaces at the atomic level, which causes a reduction in affinity for solvents. Thus, despite the specific and useful properties of carbon nanotubes, it has been very difficult to produce a polymer-based nanocomposite containing uniformly dispersed carbon nanotubes, which makes it practically difficult to use carbon nanotubes in various applications.

Many attempts have been made to improve the dispersibility of carbon nanotubes in a solvent, but such attempts are not always effective enough. For example, there is proposed a method of dispersing carbon nanotubes in acetone under application of ultrasonic waves (see Patent Document 1 below). However, this method has a problem in which carbon nanotubes, which can be dispersed during the application of ultrasonic waves, begin to aggregate when the ultrasonic waves application is stopped, and as carbon nanotubes increase in concentration, they aggregate and decrease in dispersibility.

It is also proposed to use a surfactant. However, the proposal also has a problem in which as the content of carbon nanotubes increases, the carbon nanotubes aggregate, so that a uniform dispersion cannot be obtained.

PRIOR ART DOCUMENTS

Patent Documents

Patent Document 1: Japanese Patent Application Laid-Open (JP-A) No. 2000-86219
Patent Document 2: JP-A No. 2000-72422

SUMMARY OF THE INVENTION

Objects to be Achieved by the Invention

The invention has been accomplished in view of the problems described above, and an object of the invention is to provide a carbon material dispersion in which carbon materials such as carbon nanotubes are fluorinated to have a polarity and therefore have good dispersibility.

Means for Solving the Problems

To solve the conventional problems, the inventors have made a study on carbon material dispersions and methods for production thereof. As a result, the invention has been completed based on the finding that the object can be achieved using the feature described below.

Thus, to solve the problems described above, the invention is directed to a carbon material dispersion, including: a fluorinated carbon material having a fluorinated surface formed by bringing a treatment gas with a fluorine concentration of 0.01 to 100 vol % into contact with a carbon material under conditions at 150 to 600°; and a dispersion medium in which the fluorinated carbon material is dispersed.

When a carbon material is simply dispersed in a dispersion medium, cohesive forces (Van der Waals forces) act between carbon material molecules to aggregate them, which makes it difficult to obtain a dispersion having uniform dispersibility. According to an embodiment of the invention, such a carbon material is subjected to a fluorination treatment, so that the carbon material has a fluorinated surface and thus has a polarity. As a result, aggregation or precipitation of carbon material molecules is prevented, so that a carbon material dispersion containing the carbon material uniformly dispersed in a dispersion medium is obtained.

In an embodiment of the invention, the fluorinated carbon material preferably has a carbon-fluorine bond introduced into its surface.

In an embodiment of the invention, the dispersion medium is preferably a polar solvent. In an embodiment of the invention, the carbon material is subjected to a fluorination treatment so that polarity is imparted to its surface. Therefore, the fluorinated carbon material has high compatibility with a polar solvent used as the dispersion medium. As a result, the dispersibility of the carbon material is further improved.

The carbon material may be carbon nanotubes, carbon nanocoils, fullerene, graphite, carbon black, diamond-like carbon, carbon fibers, or amorphous carbon. According this feature, the fluorination of these carbon materials makes it possible to obtain a dispersion in which the carbon material is uniformly dispersed without forming an aggregate.

To solve the problems described above, the invention is also directed to a method for producing a carbon material dispersion, including the steps of: bringing a treatment gas with a fluorine concentration of 0.01 to 100 vol % into contact with a carbon material under conditions at 150 to 600° C. to produce a fluorinated carbon material having a fluorinated surface; and dispersing the fluorinated carbon material in a dispersion medium.

According to the method, a treatment gas with a fluorine concentration of 0.01 to 100 vol % is brought into contact with a carbon material under conditions at 150 to 600° C. so that the surface of the carbon material can be fluorinated. Therefore, the resulting carbon material is polar relative to the carbon material before the fluorination treatment, and therefore prevented from forming an aggregate in the dispersion medium. Thus, the method makes it possible to produce a carbon material dispersion containing a carbon material uniformly dispersed in a dispersion medium.

The method preferably further includes the steps of: replacing the treatment gas with an inert gas to form an inert atmosphere after the fluorination of the carbon material; and then cooling the fluorinated carbon material to room temperature. This prevents fluorine gas from adsorbing and remaining on the surface of the fluorinated carbon material. As a result, the formation of hydrogen fluoride as a byproduct by hydrolysis of fluorine gas is prevented, so that the dispersion and the use of the dispersion do not cause any problem.

In the method, the fluorination treatment preferably includes introducing a carbon-fluorine bond into the surface of the carbon material.

In the method, a polar solvent is preferably used as the dispersion medium. In an embodiment of the invention, the carbon material is subjected to the fluorination treatment so that polarity is imparted to its surface. Therefore, the fluorinated carbon material has high compatibility with a polar solvent used as the dispersion medium. As a result, a dispersion in which the dispersibility of the carbon material is further improved can be produced.

Carbon nanotubes, carbon nanocoils, fullerene, graphite, carbon black, diamond-like carbon, carbon fibers, or amorphous carbon is preferably used as the carbon material. Using any of these carbon materials, the method can produce a carbon material dispersion in which the carbon material is uniformly dispersed without forming an aggregate.

BRIEF DESCRIPTION OF DRAWING

FIG. 1 is a picture of multi-wall carbon nanotubes fluorinated in example 1 according to the invention, which is taken with an electric field emission-type transmission electron microscope (TEM).

EMBODIMENTS FOR CARRYING OUT THE INVENTION

A description is given below of a carbon material dispersion according to an embodiment of the invention.

A carbon material dispersion according to an embodiment of the invention includes a fluorinated carbon material having a fluorinated surface and a dispersion medium in which the fluorinated carbon material is dispersed as a dispersoid. As used herein, the term "dispersion" means that the carbon material exhibits an affinity for the dispersion medium so that the carbon material and the dispersion medium are uniformly mixed in equilibrium without forming an aggregate or a precipitate.

The fluorinated carbon material has a polarity which is imparted by introducing a carbon-fluorine bond into the surface of the carbon material. The term "carbon material" means a material consisting essentially of carbon atoms. Examples of the carbon material include, but are not limited to, carbon black, carbon nanotubes, carbon nanocoils, graphite, diamond-like carbon, carbon fibers, amorphous carbon, and fullerenes. The carbon nanotubes include single wall nanotubes (SWNTs) whose structure is a single hexagonal network tube (graphene sheet), multi wall nanotubes (MWNTs) comprising multilayers of graphene sheet, fullerene tubes, Bucky tubes, and graphite fibrils.

The carbon material to be used may be chemically modified in advance. Examples of the chemically modified carbon material include, but are not limited to, carbon materials chemically modified with an organolithium or a Grignard reagent. The examples also include carbon materials chemically modified with a silicone functional group, an oxygen-containing substituent, or the like.

Examples of the silicone functional group and the oxygen-containing substituent include $-Si(CH_3)_3$, $-Si(CH_3)_2OCH_3$, $-Si(CH_3)(OCH_3)_2$, $-Si(CH_3)(OCH(CH_3)_2)_2$, $-OH$, $-COOH$, and $=O$. A carbon material having an unsaturated bond-containing functional group, which is added to increase reactivity, may also be used. Examples of the unsaturated bond-containing functional group include, but are not limited to, an allyl group, an aryl group, and $-C\equiv C-R$ (wherein R represents an alkyl group).

In an embodiment of the invention, the dispersion medium is preferably, but not limited to, a polar solvent. The polar solvent is typically, but not limited to, water, an organic solvent, or a mixed solution thereof. The organic solvent is typically, but not limited to, an alcohol such as ethanol, N,N-dimethylformamide (DMF), tetrahydrofuran (THF), cyclohexane, an ionic liquid, or the like. Among these organic solvents, the carbon material can have the highest dispersibility in an alcohol in an embodiment of the invention. In an embodiment of the invention, various inorganic materials, various metal materials, or various carbon materials may be added to the dispersion medium. Even in such cases, good handleability and high dispersibility can be provided during use. In an embodiment of the invention, the above dispersion media may be used alone or in the form of any mixture thereof.

The carbon material dispersion according to an embodiment of the invention is preferably free of a surfactant as a dispersing agent. Therefore, a dispersion consisting essentially of the carbon material and the dispersion medium can be provided. In addition, the dispersion can be prevented from being contaminated with an alkali metal, an organic substance or any other contaminant from a surfactant.

The carbon material that is fluorinated according to an embodiment of the invention may be used as a dispersing agent when a dispersion of a non-fluorinated carbon material is prepared.

Next, a description is given of a method according to an embodiment of the invention for producing a carbon material dispersion.

The method according to an embodiment of the invention for producing a carbon material dispersion includes at least the steps of fluorinating the surface of a carbon material and dispersing the fluorinated carbon material in a dispersion medium.

The step of fluorinating includes bringing a treatment gas containing at least fluorine gas into contact with a carbon material to fluorinate the surface of the carbon material. This step aims to fluorinate the carbon material, more specifically, to introduce a carbon-fluorine bond into the surface of the carbon material. Therefore, for example, it differs from an oxidation treatment for adding an oxygen-containing functional group such as a hydroxyl, carbonyl, or carboxyl group to the edge of a carbon hexagonal network plane.

The treatment gas to be used has a fluorine concentration of 0.01 to 100 vol %, preferably 0.1 to 80 vol %, more preferably 1 to 50 vol % in view of the handleability of fluorine gas. The treatment gas is preferably free of oxygen gas. If it contains oxygen gas, a hydroxyl group, a carboxyl group or the like can be introduced into the surface of the carbon material, but such an oxidation treatment has low reproducibility and may significantly damage the carbon material. When the carbon material has special physical properties derived from its structure as in the case of carbon nanotubes, it is more preferred to perform only a fluorination treatment on the carbon material. The same applies to a case where an oxidation treatment is independently performed in addition to the fluorination treatment.

The treatment gas may further contain an inert gas for diluting the fluorine gas. Such an inert gas may be of any type other than gases that react with the treatment gas and have an adverse effect on the fluorination of the structure and other than gases that react with the structure and have an adverse effect thereon or contain impurities having an adverse effect on the structure. For example, nitrogen, argon, helium, neon, krypton, xenon, and the like may be used alone or in the form of any mixture thereof. While the purity of the inert gas is not restricted, the concentration of impurities having the adverse effect in the inert gas is preferably 100 ppm or less, more preferably 10 ppm or less, in particular, preferably 1 ppm or less.

The fluorination treatment is preferably performed under temperature conditions in the range of 150 to 600° C., more preferably in the range of 150 to 400° C., in particular, preferably in the range of 150 to 350° C. When the temperature is 150° C. or more, the fluorination treatment can be facilitated. When the temperature is 600° C. or less, elimination of fluorine from the carbon-fluorine bond formed can be suppressed so that a reduction in treatment efficiency can be prevented.

The time for which the fluorination treatment is performed is generally, but not limited to, in the range of 0.5 minutes to 24 hours, preferably in the range of 1 minute to 12 hours, more preferably in the range of 1 minute to 9 hours. If the reaction time is less than 0.5 minutes, the carbon material may be insufficiently fluorinated so that it may fail to exhibit a sufficient affinity for the dispersion medium. On the other hand, even if the reaction time is increased to more than 24 hours, a reasonable effect cannot be expected, and the cost efficiency may be disadvantageously reduced.

The pressure conditions under which the fluorination treatment is performed are not restricted, and the fluorination treatment may be performed under reduced or increased pressure. In view of cost efficiency and safety, the fluorination treatment is preferably performed under normal pressure. The reaction vessel used to perform the fluorination treatment may be of any type, and a known conventional vessel such as a fixed bed reactor or a fluidized bed reactor may be used.

In an embodiment of the invention, a posttreatment step may be performed immediately after the fluorination step. The posttreatment step includes replacing the treatment gas with an inert gas to form an inert atmosphere and cooling the carbon material to room temperature. The cooling to room temperature may be standing to cool. Vacuum evacuation may be performed for the replacement with an inert gas, and then the inert gas may be introduced to reach the atmospheric pressure. This makes it possible to prevent fluorine gas from adsorbing and remaining on the surface of the fluorinated carbon material. As a result, the formation of hydrogen fluoride as a byproduct by hydrolysis of the fluorine gas is prevented, so that the dispersion and the use of the dispersion do not cause any problem. The inert gas is typically, but not limited to, nitrogen gas or the like.

In the step of dispersing the fluorinated carbon material in a dispersion medium, stirring or ultrasonication may be performed as needed. The ultrasonication may be performed while the carbon material is added to the dispersion medium. The ultrasonication conditions are not restricted and may be selected depending on the amount of the carbon material added to the dispersion medium, the type of the material, or other factors. For example, the ultrasonication is generally performed under conditions in the range of 20 to 40 kHz, 80 to 200 W, and 0.5 minutes to 2 hours.

The amount of the carbon material added to the dispersion medium may be appropriately determined depending on the type of the carbon material or the purpose of use of the dispersion. Specifically, for example, the amount of the carbon material added to the dispersion medium is preferably in the range of 0.001 to 25 vol %, more preferably in the range of 0.001 to 10 vol %, in particular, preferably in the range of 0.001 to 5 vol %, based on the total weight of the dispersion. If the amount of the addition is less than 0.001 vol %, the volume of the dispersion may become disadvantageously too large. On the other hand, if the amount is more than 25 vol %, the dispersion may disadvantageously have high viscosity, which makes the handling difficult.

The carbon material dispersion obtained by the production method described above is suitable for use in various applications such as field-effect transistors, transparent electrically-conductive films, a composite of carbon and a plastic, field emission devices, sensors, electrically-conductive paints, and wiring boards.

EXAMPLES

Preferred examples of the invention are described in detail below in an illustrative manner. It will be understood that the materials, the contents and other conditions described in the examples are not intended to limit the scope of the invention.

Example 1

Multi-wall carbon nanotubes (500 mg) were introduced into a PTFE (polytetrafluoroethylene) vessel (5 mL in volume), and the vessel was placed in an electro-polished SUS316L chamber (30 mL in volume). The atmosphere in the chamber was replaced with nitrogen under vacuum. Under a nitrogen stream (20 mL/minute), the vessel in the chamber was heated at a rate of 2° C./minute to 250° C. and subjected to an isothermal treatment for 3 hours.

The nitrogen was then replaced, under vacuum, with a treatment gas containing 20 vol % of fluorine gas diluted with nitrogen, and 20 vol % fluorine was allowed to flow at a rate of 25 mL/minute. The chamber was then heated at a rate of 8° C./minute to 150° C., and an isothermal treatment was performed for 4 hours. Subsequently, under a nitrogen stream (20 mL/minute), the chamber was allowed to cool to room temperature. The atmosphere in the chamber was replaced with nitrogen under vacuum, and the multi-wall carbon nanotubes were taken out.

An infrared spectrometer (FTIR-8200PC, Shimadzu Corporation) and an X-ray photoelectron spectrometer (AXIS-HSi manufactured by Kratos) were used to detect a carbon-fluorine bond in the treated multi-wall carbon nanotubes. A peak was observed at about 1192.3 in the infrared spectroscopy (KBr pellet method), and a C1s peak was observed at 289.5 eV (after charge correction with the unmodified carbon at 285.0 eV) in the X-ray photoelectron spectroscopy. These peaks are derived from a carbon-fluorine bond.

FIG. 1 shows an image obtained by the observation of the treated multi-wall carbon nanotubes with a field emission-type transmission electron microscope (TEM) (HF-2000 manufactured by Hitachi, Ltd.). As is evident from the picture, the spacing between outer layers of the multi-wall carbon nanotubes has increased, and it has been demonstrated that the outer layers of the multi-wall carbon nanotubes are fluorinated. A field emission-type scanning electron microscope (SEM) (S-1400 manufactured by Hitachi, Ltd.) observation and TEM observation have also shown that graphite or the like is not produced by the decomposition of the carbon nanotubes. After the treatment, the degree of the introduction of fluorine was measured as an increase in weight and expressed as the ratio of the number of fluorine atoms to the number of carbon atoms (CFx). As a result, the fluorinated multi-wall carbon nanotubes had a CFx (x=0.10).

Example 2

Multi-wall carbon nanotubes (500 mg) were introduced into a nickel vessel (5 mL in volume), and the vessel was placed in a nickel chamber (30 mL in volume). The atmosphere in the chamber was replaced with nitrogen under vacuum. Under a nitrogen stream (20 mL/minute), the vessel in the chamber was heated at a rate of 2° C./minute to 350° C. and subjected to an isothermal treatment for 3 hours.

The nitrogen was then replaced, under vacuum, with a treatment gas containing 20 vol % of fluorine gas diluted with nitrogen, and 20 vol % fluorine was allowed to flow at a rate of 25 mL/minute. The chamber was then heated at a rate of 8° C./minute to 350° C., and an isothermal treatment was performed for 4 hours. Subsequently, under a nitrogen stream (20 mL/minute), the chamber was allowed to cool to room temperature. The atmosphere in the chamber was replaced with nitrogen under vacuum, and the multi-wall carbon nanotubes were taken out.

The infrared spectrometer and the X-ray photoelectron spectrometer were used to detect a carbon-fluorine bond in the treated multi-wall carbon nanotubes. A peak was observed at about 1192.3 in the infrared spectroscopy (KBr pellet method), and a C1s peak was observed at 289.5 eV (after charge correction with the unmodified carbon at 285.0 eV) in the X-ray photoelectron spectroscopy. SEM observation was further performed. As a result, it has been shown that graphite or the like is not produced by the decomposition of the carbon nanotubes. The fluorinated multi-wall carbon nanotubes had a CFx (x=0.49).

Example 3

Multi-wall carbon nanotubes (500 mg) were introduced into a nickel vessel (5 mL in volume), and the vessel was placed in a nickel chamber (30 mL in volume). The atmosphere in the chamber was replaced with nitrogen under vacuum. Under a nitrogen stream (20 mL/minute), the vessel in the chamber was heated at a rate of 2° C./minute to 600° C. and subjected to an isothermal treatment for 3 hours.

The nitrogen was then replaced, under vacuum, with a treatment gas containing 20 vol % of fluorine gas diluted with nitrogen, and 20 vol % fluorine was allowed to flow at a rate of 25 mL/minute. The chamber was then heated at a rate of 8° C./minute to 600° C., and an isothermal treatment was performed for 10 minutes. Subsequently, under a nitrogen stream (20 mL/minute), the chamber was allowed to cool to room temperature. The atmosphere in the chamber was replaced with nitrogen under vacuum, and the multi-wall carbon nanotubes were taken out.

The infrared spectrometer and the X-ray photoelectron spectrometer were used to detect a carbon-fluorine bond in the treated multi-wall carbon nanotubes. A peak was observed at about 1192.3 in the infrared spectroscopy (KBr pellet method), and a C1s peak was observed at 289.5 eV (after charge correction with the unmodified carbon at 285.0 eV) in the X-ray photoelectron spectroscopy. SEM observation was further performed. As a result, it has been shown that graphite or the like is not produced by the decomposition of the carbon nanotubes. The fluorinated multi-wall carbon nanotubes had a CFx (x=0.32).

Example 4

Graphite (500 mg) was placed in a PTFE vessel (5 mL in volume), and the vessel was placed in an electro-polished SUS316L chamber (30 mL in volume). The atmosphere in the chamber was replaced with nitrogen under vacuum. Under a nitrogen stream (20 mL/minute), the vessel in the chamber was heated at a rate of 2° C./minute to 250° C. and subjected to an isothermal treatment for 3 hours.

The nitrogen was then replaced, under vacuum, with a treatment gas containing 20 vol % of fluorine gas diluted with nitrogen, and 20 vol % fluorine was allowed to flow at a rate of 25 mL/minute. The chamber was then heated at a rate of 8° C./minute to 150° C., and an isothermal treatment was performed for 4 hours. Subsequently, under a nitrogen stream (20 mL/minute), the chamber was allowed to cool to room temperature. The atmosphere in the chamber was replaced with nitrogen under vacuum, and the graphite was taken out.

The infrared spectrometer and the X-ray photoelectron spectrometer were used to detect a carbon-fluorine bond in the treated graphite. A peak was observed at about 1192.3 in the infrared spectroscopy (KBr pellet method), and a C1s peak was observed at 289.5 eV (after charge correction with the unmodified carbon at 285.0 eV) in the X-ray photoelectron spectroscopy. The fluorinated graphite had a CFx (x=0.15).

Comparative Example 1

Multi-wall carbon nanotubes (500 mg) were introduced into a PTFE vessel (5 mL in volume), and the vessel was placed in an electro-polished SUS316L chamber (30 mL in volume). The atmosphere in the chamber was replaced with nitrogen under vacuum. Under a nitrogen stream (20 mL/minute), the vessel in the chamber was heated at a rate of 2° C./minute to 250° C. and subjected to an isothermal treatment for 3 hours.

The nitrogen was then replaced, under vacuum, with a treatment gas containing 0.005 vol % of fluorine gas diluted with nitrogen, and 0.005 vol % fluorine was allowed to flow at a rate of 25 mL/minute. The chamber was then heated at a rate of 8° C./minute to 150° C., and an isothermal treatment was performed for 4 hours. Subsequently, under a nitrogen stream (20 mL/minute), the chamber was allowed to cool to room temperature. The atmosphere in the chamber was replaced with nitrogen under vacuum, and the multi-wall carbon nanotubes were taken out.

The infrared spectrometer and the X-ray photoelectron spectrometer were used to detect a carbon-fluorine bond in the treated multi-wall carbon nanotubes. A weak peak was observed at about 1192.3 in the infrared spectroscopy (KBr pellet method), and a weak C1s peak was observed at 289.5 eV (after charge correction with the unmodified carbon at 285.0 eV) in the X-ray photoelectron spectroscopy. After the fluorination treatment, the multi-wall carbon nanotubes had a CFx (x=0.005).

Comparative Example 2

Multi-wall carbon nanotubes (500 mg) were placed in a PTFE vessel (5 mL in volume), and the vessel was placed in an electro-polished SUS316L chamber (30 mL in volume). The atmosphere in the chamber was replaced with nitrogen under vacuum. Under a nitrogen stream (20 mL/minute), the vessel in the chamber was heated at a rate of 2° C./minute to 250° C. and subjected to an isothermal treatment for 3 hours.

After standing to cool to room temperature, the nitrogen was then replaced, under vacuum, with a treatment gas containing 20 vol % of fluorine gas diluted with nitrogen, and 20 vol % fluorine was allowed to flow at a rate of 25 mL/minute, when an isothermal treatment was performed for 20 minutes. Subsequently, under a nitrogen stream (20 mL/minute), the atmosphere in the chamber was replaced with nitrogen under vacuum, and the multi-wall carbon nanotubes were taken out.

The infrared spectrometer and the X-ray photoelectron spectrometer were used to detect a carbon-fluorine bond in the treated multi-wall carbon nanotubes. A weak peak was observed at about 1192.3 in the infrared spectroscopy (KBr pellet method), and a weak C1s peak was observed at 289.5 eV (after charge correction with the unmodified carbon at 285.0 eV) in the X-ray photoelectron spectroscopy. After the fluorination treatment, the multi-wall carbon nanotubes had a CFx (x=0.003).

Comparative Example 3

In this comparative example, the multi-wall carbon nanotubes used in example 1 were used without being subjected to a fluorination treatment.

Production of Dispersions and Evaluation of Dispersibility

After the fluorination treatment, multi-wall carbon nanotubes obtained in each example were added to a dispersion medium (hereinafter, the resulting mixture is referred to as the "initial dispersion") so that a preparation with the initial concentration shown in table 1 below was obtained. The type of the dispersion medium is shown in table 1 below. Each of the resulting dispersions was diluted 10-fold with the same dispersion medium and then further diluted with the same dispersion medium so that a 100-fold dilution was obtained. Each dispersion prepared with the concentration was measured for absorbance at 250 nm with a spectrophotometer, and a concentration calibration curve was prepared.

One mL was sampled from each initial dispersion at the initial stage of the preparation and after standing for 120 hours, and the sampled dispersions were each diluted 10-fold with the same dispersion medium. Subsequently, the 10-fold dilution of the dispersion was measured for absorbance at 250 nm. The absorbance was multiplied by 10, when the concentration of the multi-wall carbon nanotubes of each example was calculated from the concentration calibration curve. The results are shown in table 1 below.

After the fluorination treatment, the multi-wall carbon nanotube dispersions were all neutral. This demonstrated that no hydrogen fluoride was produced as a byproduct in the multi-wall carbon nanotubes after the fluorination treatment.

Evaluation

As shown in table 1 below, it was found that the change in the initial concentration was small with respect to each dispersion prepared by dispersing, in a dispersion medium, the multi-wall carbon nanotubes or graphite obtained in each of examples 1 to 4. Thus, it was found that the carbon material obtained in each Example formed little precipitate and showed good dispersibility even after 120 hours. In contrast, it was found that the dispersion prepared by dispersing, in a dispersion medium, the multi-wall carbon nanotubes obtained in each of comparative examples 1 and 2 was reduced in concentration as compared with the case of each example and formed a precipitate. The multi-wall carbon nanotubes obtained in comparative example 3 were not dispersed in ethanol from the beginning when they were added to ethanol.

TABLE 1

| | | Dispersion concentration (mg/mL) | |
|---|---|---|---|
| | Dispersion medium type | Initial stage | After 120 hours |
| Examples 1 | Ethanol | 0.100 | 0.100 |
| | Water | 0.097 | 0.095 |
| | THF | 0.099 | 0.098 |
| | Dimethyl carbonate | 0.098 | 0.097 |
| Examples 2 | Ethanol | 0.095 | 0.082 |
| Examples 3 | Ethanol | 0.096 | 0.090 |
| Examples 4 | Ethanol | 0.097 | 0.095 |
| Comparative Examples 1 | Ethanol | 0.015 | 0.015 |
| Comparative Examples 2 | Ethanol | 0.010 | 0.001 |
| Comparative Examples 3 | Ethanol | Not dispersed | Not dispersed |

The invention claimed is:

1. A carbon material dispersion, comprising:
   a fluorinated carbon material having a fluorinated surface formed by bringing a treatment gas with a fluorine concentration of 0.01 to 20 vol % into contact with a carbon material under conditions of a treatment time of 4 to 24 hours and a treatment temperature of 150 to 350° C.; and
   a dispersion medium in which the fluorinated carbon material is dispersed,
   wherein a surface of the fluorinated carbon material is free from fluorine gas and the fluorinated carbon material is added in an amount of 0.001 to 25 vol % based on the total weight of the dispersion to the dispersion medium.

2. The carbon material dispersion according to claim 1, wherein the fluorinated carbon material has a carbon-fluorine bond introduced into its surface.

3. The carbon material dispersion according to claim 1, wherein the dispersion medium is a polar solvent.

4. The carbon material dispersion according to claim 1, wherein the carbon material is carbon nanotubes, carbon nanocoils, fullerene, graphite, carbon black, diamond-like carbon, carbon fibers, or amorphous carbon.

5. A method for producing a carbon material dispersion, comprising the steps of:
   bringing a treatment gas with a fluorine concentration of 0.01 to 20 vol % into contact with a carbon material under conditions of a treatment time of 4 to 24 hours and a treatment temperature of 150 to 350° C. to produce a fluorinated carbon material having a fluorinated surface;
   performing a vacuum evacuation of the treatment gas;
   reducing or removing fluorine gas adsorbed and remaining on the surface of the fluorinated carbon material by introducing an inert gas to reach the atmospheric pressure; and dispersing the fluorinated carbon material in a dispersion medium
wherein the fluorinated carbon material is added in an amount of 0.001 to 25 vol % based on the total weight of the dispersion to the dispersion medium.

6. The method according to claim 5, further comprising the steps of: cooling the fluorinated carbon material to room temperature after the step of reducing or removing fluorine gas.

7. The method according to claim 5, wherein in the fluorination, a carbon-fluorine bond is introduced into a surface of the carbon material.

8. The method according to claim 7, wherein a polar solvent is used as the dispersion medium.

9. The method according to claim 5, wherein carbon nanotubes, carbon nanocoils, fullerene, graphite, carbon black, diamond-like carbon, carbon fibers, or amorphous carbon is used as the carbon material.

10. The method according to claim 5, wherein immediately after the treatment gas is brought into contact with the carbon material, the vacuum evacuation of the treatment gas is performed and the inert gas is introduced so that an inert atmosphere is formed, and the carbon material is cooled to room temperature and then dispersed in the dispersion medium.

\* \* \* \* \*